United States Patent [19]

Nicks

[11] 4,294,887
[45] Oct. 13, 1981

[54] PRODUCTION OF COATING FILMS FROM AUTOXIDIZABLE MATERIALS AND COATING COMPOSITIONS CAPABLE OF PRODUCING SUCH FILMS

[75] Inventor: Peter F. Nicks, Maidenhead, England

[73] Assignee: Imperial Chemical Industries Limited, London, England

[21] Appl. No.: 76,726

[22] Filed: Sep. 18, 1979

[30] Foreign Application Priority Data

Sep. 27, 1978 [GB] United Kingdom ............... 38332/78

[51] Int. Cl.$^3$ ............................................. B32B 27/40
[52] U.S. Cl. .................................. 428/423.1; 106/223; 106/249; 106/252; 106/264; 260/18 EP; 260/18 TN; 260/22 XA; 260/22 CA; 427/331; 428/425.6; 428/430; 428/441; 428/480; 428/497; 525/445
[58] Field of Search ..................... 427/386, 385.5, 331; 428/413, 423.1, 425.6, 430, 441, 480, 497; 260/18 R, 18 EP, 18 TN, 18 PP, 22 CQ, 22 R, 23 ST, 22 T, 18 VP, 22 XA, 22 CA; 106/222, 223, 249, 252, 264; 525/445

[56] References Cited

U.S. PATENT DOCUMENTS

| | | | |
|---|---|---|---|
| 1,980,367 | 11/1934 | Aver | 106/223 X |
| 2,207,847 | 7/1940 | Aver | 260/20 |
| 2,558,025 | 6/1951 | Wicks, Jr. | 106/252 X |
| 3,781,214 | 12/1973 | Nemoto | 260/22 TN |
| 3,881,942 | 5/1975 | Buckwalter | 106/22 |
| 3,882,007 | 5/1975 | Watanabe et al. | 204/159.15 |
| 3,951,891 | 4/1976 | Töpfl et al. | 260/21 |
| 4,039,723 | 8/1977 | Moyer et al. | 428/521 |
| 4,100,046 | 7/1978 | Hodakowski et al. | 204/159.23 |
| 4,172,157 | 10/1979 | Nowak et al. | 427/54.1 |

*Primary Examiner*—Ronald H. Smith
*Assistant Examiner*—Thurman K. Page
*Attorney, Agent, or Firm*—Cushman, Darby & Cushman

[57] ABSTRACT

Coating films are prepared by exposing to oxygen, particularly at ambient temperatures, a composition comprising (a) a film-forming material comprising moieties of an ethylenically unsaturated fatty acid containing at least two ethylenically unsaturated groups and (b) a strong acid which is fully dissociated in water. Suitable film-forming materials are oil-modified alkyd resins and suitable acids are alkyl/aryl sulphonic acids. Curable compositions and polymeric products, optionally modified with non-autoxidisable polymerizable materials, are also provided.

11 Claims, No Drawings

PRODUCTION OF COATING FILMS FROM AUTOXIDIZABLE MATERIALS AND COATING COMPOSITIONS CAPABLE OF PRODUCING SUCH FILMS

This invention relates to the production of coating films from autoxidisable materials comprising moieties of an ethylenically unsaturated fatty acid and to coating compositions capable of producing such films; and to new polymeric products.

Compositions which contain film-forming materials comprising moieties of certain unsaturated fatty acids derived from natural oils, have long been used in the production of coatings. A particularly useful class of the film-forming materials used in these compositions is that of oil-modified alkyd resins. The compositions just described, which usually contain also a volatile solvent, are applied to a substrate as a liquid coating and this coating is subsequently cured in the presence of oxygen in the atmosphere by an autoxidation process to produce a hard film. The autoxidation process may be accelerated by stoving and/or by the incorporation in the coating composition of a metal "drier" salt which catalyses the process. Suitable metal "drier" salts in the known compositions are the naphthenates or oleates of cobalt, manganese and lead. However, there are disadvantages in the use of the metal drier salts. In particular there is a discolouration in white-pigmented coatings due to the fact that the metals used to catalyse the autoxidation process provide coloured ions.

We have now found that the curing of coating compositions containing a film-forming material comprising moieties of certain unsaturated fatty acids can be accelerated to produce a hard coating film in the presence of oxygen using a metal-free catalyst which does not impart the colouration associated with the conventional metal drier salts.

According to this invention we provide a method of preparing a cured coating film by applying to a substrate a liquid coating which comprises (a) a film-forming material comprising moieties of an ethylenically unsaturated fatty acid containing at least two ethylenically unsaturated groups and (b) as metal-free catalyst an acid which is fully dissociated in water, and thereafter exposing the coating to an oxygen-containing atmosphere until it is fully cured.

According to a further aspect of this invention we provide a composition capable of curing in the presence of oxygen which comprises (a) a film-forming material comprising moieties of an ethylenically unsaturated fatty acid containing at least two ethylenically unsaturated groups and (b) as metal-free catalyst an acid which is fully dissociated in water.

We further provide a cured coating film prepared by the method just described.

We also provide a polymeric product which is prepared by treating with oxygen a film-forming material comprising moieties of an ethylenically unsaturated fatty acid containing at least two ethylenically unsaturated groups in the presence of an acid which is fully dissociated in water.

Usually the coating composition will also comprise a liquid diluent, for example a solvent for the film-forming material and/or for the acidic catalyst. Suitable solvents include for example aliphatic and/or aromatic hydrocarbons, esters and ketones. In general it is preferred that the acid catalyst is soluble in the film-forming material or that there is present a common solvent for the catalyst and for the film-forming material.

The moieties of ethylenically unsaturated fatty acids containing at least two ethylenically unsaturated groups are most commonly derived from natural oils in which certain fatty acids occur as esters of glycerol. They may also be derived from modified natural oils, for example oils which have been catalytically treated. Preferably the moiety of the fatty acid comprises an aliphatic hydrocarbon chain containing 8–22 carbon atoms and at least two ethylenically unsaturated groups, the hydrocarbon chain being attached to the residue of a carboxylic acid group resulting from esterification with a hydroxyl group. The ethylenically unsaturated groups of the fatty acid moiety may be conjugated or unconjugated and, depending upon their source, the natural oils contain varying proportions of the conjugated and unconjugated fatty acid moieties. The fatty acid moiety may be introduced into the film-forming material by known methods, for example by esterification with the free fatty acid or by ester interchange.

Suitable moieties of an ethylenically unsaturated acid containing at least two unsaturated groups include those comprised in the natural drying oils linseed oil, soya bean oil, cottonseed oil, oiticica oil, poppyseed oil, perilla oil, rape seed oil, safflower oil, sunflower oil, tung oil, tall oil and dehydrated castor oil. Another suitable fatty acid moiety is that derived from "isomerginate oil", a naturally occurring oil in which the polyunsaturation has been modified catalytically so that it comprises a high proportion of conjugated unsaturation.

Particularly suitable fatty acid moieties are those which contain conjugated ethylenic unsaturation, and such moieties are present in a significant proportion in linseed oil, dehydrated castor oil, tung oil and isomerginate oil.

Suitable film-forming materials which may comprise moieties of the above-mentioned acids include oil-modified alkyd resins; oil-modified addition polymers of ethylenically unsaturated monomers, for example styrene, methyl methacrylate and their homologues; epoxy esters of ethylenically unsaturated fatty acids; oil-modified polyurethane oils and oil-modified polyurethane alkyds.

Particularly suitable film-forming materials in this invention are the oil-modified alkyd resins, more particularly those resins which contain an excess of hydroxyl groups over acid groups such that the hydroxyl value of the resin lies in the range 20–200 mg KOH/g of resin; the oil-modified addition polymers which also contain a similar excess of hydroxyl groups.

Preferably the film-forming material has an acid value in the range 0–15 mg KOH/g.

Preferably the film-forming material comprises at least 30% by weight of the unsaturated fatty acid moieties. Preferably the proportion of these moieties is not higher than about 70% by weight. Moieties of a saturated fatty acid may also be present in the film-forming material. Moieties of the saturated fatty acids lauric and stearic acid may be present, for example, in order to increase solubility in aliphatic solvents.

Typical conjugated ethylenically unsaturated fatty acid moieties containing at least two ethylenically unsaturated groups which may be present in the film-forming material used in this invention include those derived from eleostearic acid and those derived by isomerisation of $C_{18}$ diethenoid and other non-conjugated fatty acids.

Likewise typical non-conjugated ethylenically unsaturated fatty acid moieties include those derived from linoleic acid and linolenic acid.

The metal-free acid catalyst for curing the film-forming material should be a strong acid such that a solution of the acid in water is essentially fully dissociated, i.e. the acid does not have a finite $pK_a$ value. Suitable acid catalysts include sulphonic acids e.g. paratoluene sulphonic acid; dodecyl and other alkyl/aryl sulphonic acids, aryl sulphonic acids such as benzene sulphonic acid; methane sulphonic acid; ethane sulphonic acid; propane sulphonic acid; butane sulphonic acid; hydrochloric acid and sulphuric acid.

Particularly preferred catalysts are paratoluene sulphonic acid or dodecylbenzene sulphonic acid. Mixtures of sulphonic acids may be used, for example a 1/1 by weight blend of methane sulphonic acid and dodecylbenzene sulphonic acid.

The proportion of the acid catalyst which is used in this invention is preferably in the range 0.1–20%, more preferably 1–6.%, by weight based on the weight of the film-forming material.

In the preparation of a coating composition according to the invention the acid catalyst may be separately dissolved in a solvent and then added to a solution of the film-forming material, or the acid catalyst may be added directly to a solution of the film-forming polymer. It is preferred to add the catalyst to the solution of film-forming material as a solution in a suitable solvent such as an alcohol.

The present coating compositions may comprise any ingredient conventional in such compositions, for example those ingredients used in the formulation of paints, such as pigments, extenders and fillers. These materials should be stable in the presence of strong acids.

As a further aspect of this invention we have found that the properties of a coating film made according to the invention may be modified when there is present in the composition hereinbefore described a nonautoxidisable ethylenically unsaturated monomeric, oligomeric or other material containing ethylenically unsaturated groups, which is polymerisable in the presence of free radicals.

Thus we provide a coating film and also a polymeric product which are prepared by treating with or exposing to oxygen a composition which comprises (a) a film-forming material comprising moieties of an ethylenically unsaturated acid containing at least two ethylenically unsaturated groups, (b) as a metal-free catalyst an acid which is fully dissociated in water and (c) a non-autoxidisable ethylenically unsaturated monomeric, oligomeric or other material containing ethylenically unsaturated groups which is polymerisable in the presence of free radicals.

We also provide a composition as just described.

The non-autoxidisable polymerisable material may contain one or more ethylenically unsaturated groups. Suitable monomeric materials include mono-functional unsaturated materials, for example, styrene, vinyl toluene, methyl methacrylate, and higher methacrylates such as lauryl methacrylate and the corresponding acrylates. Suitable difunctional monomeric materials include ethylene glycol dimethacrylate and hexane diol dimethacrylate. Other suitable radical-polymerisable ethylenically unsaturated materials include unsaturated polyesters.

The present coating films, coating compositions and polymeric products may be used in a wide variety of applications, for example in paints, varnishes, herbicides and printing inks. They have advantages over compositions which are otherwise similar but which contain metal drier salts. Advantages include (a) the reduction of autoxidation by-products in the final coating, and hence unpleasant odour is diminished; (b) since heavy metals are absent toxicity is reduced; (c) the initial presence (at least) of unwanted colour is diminished; and (d) the curing of the film-forming material occurs throughout the coating film.

The invention is illustrated by the following Examples in which parts and percentages are by weight unless otherwise stated.

EXAMPLE 1

This Example illustrates the influence of different mixtures of unsaturated fatty acid moieties present in different oils, which are used to modify an alkyd resin, on the curing process according to the invention. It shows that those moieties containing conjugated unsaturation are to be preferred.

Six alkyd resins based on a reactant molar formula: Pentaerythritol/Glycerol/phthalic anhydride/unsaturated fatty acid = 2/0.33/2/3 were prepared by a conventional condensation polymerisation procedure. The reactants were condensed such that the residual acid value of the final resin was in the range 5–10 mg KOH/g and the products were thinned to 70% solids in white spirit (principally aliphatic hydrocarbon boiling range 140°–200° C. but also containing approximately 15% aromatic hydrocarbon).

The unsaturated fatty acid moieties were introduced into the alkyd resins either by using in the condensation reaction the free unsaturated fatty acid or the triglyceride of the unsaturated fatty acid (i.e. the drying oil), as follows:

1. Linseed oil fatty acid
2. Tall oil fatty acid
3. Linseed oil/Tung oil = 2/1 (w/w)
4. Dehydrated castor oil fatty acid
5. Soya bean oil fatty acid
6. Isomerginic acid (a commercially available acid containing conjugated unsaturation)

The alkyd resins each had an unsaturated fatty acid content of 62.5% and an excess hydroxyl content of 82.5 mg KOH/g at acid value = 0.

Six gloss paints were prepared, using each of the alkyd resins prepared from the fatty acid or oil 1–6 respectively, by dispersing 150 parts of rutile titanium dioxide in 296 parts of the resin dissolved in white spirit at 70% solids content. The paints were thinned to a viscosity of 4 poise measured at 25° C. and 10,000 secs$^{-1}$. by the addition of more white spirit.

To 100 part samples of each of the six paints was added with stirring 4.6 parts of a 50% solution of paratoluene sulphonic acid dissolved in ethoxy ethanol. Each paint sample was immediately supplied to a glass panel to give a wet film of two thousandths of an inch thickness, and allowed to dry at 20° C. After 16 hours the films of paints prepared from resins containing unsaturated fatty acid moieties 1,3,4 and 6 which contain a significant proportion of fatty acid moieties containing conjugated unsaturation were all tack-free, hard-dry, and tough, but those of 2 and 5 based on soya bean oil and tall oil fatty acids respectively which contain only little conjugated unsaturation, although dry, were markedly softer.

EXAMPLE 2

This Example illustrates the effect of the proportion of moieties of unsaturated fatty acid in the alkyd resin on the curing process according to the invention.

Three alkyd resins (a), (b) and (c) were prepared at 62%, 43% and 25% fatty acid contents respectively by condensing the following molar proportions of reactants: (The differing polyol ingredients were necessary to achieve these fatty acid contents as well as producing a satisfactory resin).

(a) Pentaerythritol/glycerol/phthalic anhydride/dehydrated castor oil fatty acids = 2/0.33/2/3.

(b) Glycerol/phthalic anhydride/dehydrated castor oil fatty acids = 5.5/5.5/3.

(c) Trimethylol propane/phthalic anhydride/dehydrated castor oil fatty acids = 11/10/3.

Alkyd (a) was thinned to 40% solids in white spirit (as in Example 1) whilst alkyds (b) and (c) were thinned to 40% solids in xylene.

White pigmented paints were prepared from each of alkyds (a) (b) and (c) by the method described in Example 1 and thinned to a viscosity of 4 poise at 25° C. and 10,000 secs$^{-1}$ with the appropriate solvents.

100 g samples of each paint were catalysed by the addition of 4% by weight (calculated on the non-volatile content of alkyd resin in the paint) of paratoluene sulphonic acid monohydrate added as a 50% solution in ethoxyethanol.

Wet films of each paint of four thousandths of an inch thickness were spread on glass and allowed to dry in air at 20° C. Each of the films were glossy, hard and very tough after 16 hours drying time. The extent to which each film was cross-linked (i.e. had cured) was assessed by rubbing the film (after 24 hours drying time) with a felt pad saturated with xylene. Paints based on resins (a) and (b) needed 30 rubs to dissolve the film whereas that based on resin (c) dissolved completely after two rubs.

EXAMPLE 3

This Example illustrates the invention with respect to five addition polymers as the film-forming material each of which polymers comprises moieties of a different unsaturated fatty acid. The best results were obtained when the unsaturated fatty acid contained a high level of conjugated unsaturation.

A linear addition polymer having the molar composition styrene/methyl methacrylate/glycidyl methacrylate = 1/1/1 was prepared by the addition polymerisation of the stated monomers dissolved in a mixture of ethyl acetate and xylene (=1/2, w/w), using azobisdiisobutyronitrile as the initiator (2% based on the total weight of monomers). Six samples of the polymer thus prepared were modified by reaction of each sample with one of the fatty acids (a) Soya bean oil fatty acid
(b) Tall oil fatty acid
(c) Dehydrated castor oil fatty acid
(d) Oleic acid, and
(e) Isomerginic fatty acid To 866 parts of the addition polymer solution at 40% solids content in ethyl acetate/xylene were added 270 parts of one of the unsaturated fatty acids mentioned above i.e. 95% of the stoichiometric equivalent of glycidyl groups in the polymer and 1.4 parts of NN$^1$ dimethyl coconut amine ("Armeen" DMCD) as catalyst. The ethyl acetate was removed by distillation until the reaction temperature was 150° C. The reaction mixture was held at 150° C. until the residual acid value was 2–4 mg/g. The hydroxyl content of the unsaturated fatty acid-modified polymer was 91 mg KOH/g and the unsaturated fatty acid content was 44%.

Paints were prepared from each of these modified polymers by dispersing 150 parts of rutile titanium dioxide in a solution of 329 parts of the resin in xylene solution at 63% solids using a bead mill. The pigment/volume concentration of each paint was 15%. Samples of each paint were catalysed by addition of 16.6 parts of a 50% solution of paratoluene sulphonic acid monohydrate dissolved in ethoxyethanol. (4% w/w of catalyst on the non-volatile resin content of the paint). The paints were thinned to a viscosity of 4 poise at 25° C. and 10,000 secs$^{-1}$ by addition of xylene.

Wet films four thousandths of an inch thick were spread on glass and were allowed to dry at room temperature for 16 hours. The rate of through-hardening of each film was assessed using the BK (Beck Koller) Drying Recorder (Mickle Laboratory Engineering Company) for determining the drying characteristics of films. The degree of cross-linking was also assessed by rubbing the films with a pad saturated with xylene.

The results indicated that the highest degree of cross-linking in a film occurred with those polymers which were based on fatty acids having the highest level of conjugated unsaturation. Thus resins (a) and (e) based on dehydrated castor oil fatty acid and isomerginic acid showed the highest level of cross-linking; those resins based on soya bean oil fatty acid and tall oil fatty acid gave an intermediate result; whilst the resin based on oleic acid gave a poor result.

Measurement of the drying rate of the paints sample which was exposed to air (and when containing different unsaturated drying oil moieties) using a BK Drying Recorder gave the following results:

Dehydrated castor oil fatty acid—1.25 hours
Soya Bean oil fatty acid—2.5 hours
Tall oil fatty acid—3.5 hours
Oleic acid—12+ hours
Isomerginic acid—1.5 hours

EXAMPLE 4

This Example illustrates that the presence of oxygen is essential to the performance of the present invention.

Two samples of paint prepared from an alkyd resin and based on linseed oil fatty acids, as described in Example 1, were catalysed with paratoluene sulphonic acid monohydrate (4% w/w, on the non-volatile content of alkyd resin in the paint and added as a 50% solution in ethoxyethanol) were spread on glass panels as films of four thousandths of an inch thickness.

One of the films was placed in a sealed glass vessel filled with nitrogen (and through which a slow current of nitrogen was passed) and the other film was placed in a glass vessel through which a current of air was passed. Examination of the films after 16 hours at room temperature showed that the film which had been exposed to air had dried to give a hard tough solvent-resistant glossy film whereas that which had been exposed to nitrogen remained tacky and uncross-linked.

EXAMPLE 5

This Example illustrates that conventional antioxidants inhibit cross-linking according to the invention.

To two further samples of the paint used in Example 4 were added 0.05 and 0.1% respectively of 4:4$^1$− bis(6-tert-butyl-m-cresol), (commercially available from Monsanto Chemicals Ltd as "Santowhite" and marketed as an oxidation inhibitor) based on the non-volatile alkyd resin content of the paint. The antioxidant was added as a 10% solution in ethoxyethanol. The two samples and a further sample of the same paint containing no "Santowhite" were catalysed with 4% paratoluene sulphonic acid monohydrate as in Example 4. Films of the paints four thousandths of an inch thick were spread on glass and allowed to dry in air at room temperature for 16 hours. The film containing no antioxidant was tack-free and tough and glossy at the end of this time whereas the films of both paints containing the antioxidant remained soft and tacky.

EXAMPLE 6.

This Example illustrates the effect of different acid catalysts. Acids 1–5 are useful in the inventions whereas acids 6–10 are not useful.

Samples of paint based on the linseed oil fatty acid-modified alkyd described in Example 4 were each catalysed with different acids as shown in the list below. The quantity of paratoluene sulphonic acid used was 4% based on the non-volatile alkyd resin content of the paint. Other acids were added at the equivalent molar concentration. Where necessary the acid was diluted with an appropriate solvent compatible with the paint before addition to ensure solubility of the acid in the paint medium. Films of the catalysed paint four thousandths of an inch thick were spread on glass panels and the degree of cross-linking achieved was assessed by measurement of tack-free time using a Sand-track machine.

| Acid catalyst | Effectiveness | Tack-free time (Hrs) |
|---|---|---|
| 1. paratoluene sulphonic | very effective | 3 |
| 2. methane sulphonic | " | 3 |
| 3. dodecylbenzene sulphonic | " | 3 |
| 4. hydrochloric | " | 3 |
| 5. sulphuric | " | 3 |
| 6. phosphoric | not effective | 20 |
| 7. butyl hydrogen maleate | " | still wet after 24 |
| 8. malonic | " | still wet after 24 |
| 9. oxalic | " | still wet after 24 |
| 10. cyclohexyl phosphonic | " | still wet after 24 |

EXAMPLE 7

This Example illustrates that under comparable conditions there is an improvement in the extent of cross-linking according to the present invention as compared with the use of metal driers.

Samples of the paints described in Example 2 were catalysed by addition of metal driers (0.1% Co and 1% Pd based on the non-volatile alkyd resin content of the paints) as the metal octoates rather than by the addition of paratoluene sulphonic acid. Films of the paints four thousandths of an inch thick were spread on glass and allowed to dry for 16 hours at 20° C. Assessment of the hardness of the films and of their resistance to xylene showed that all were inferior to those paints of Example 2 catalysed with paratoluene sulphonic acid. The paint based on the 62% fatty acid-containing alkyd gave a tough film but which was readily attacked by xylene; those paints based on alkyds having lower fatty acid contents gave films which were tacky and which were readily dissolved in xylol.

EXAMPLE 8

This Example illustrates the different effects of ultra-violet light on cured paint films comprising (a) a conventional metal drier or (b) an acid catalyst according to the invention.

Two samples of a paint based on the linseed oil-modified alkyd described in Example 1 were catalysed respectively with 4% paratoluene sulphonic acid and with a mixture of 0.1% cobalt and 1% lead (calculated on the non-volatile alkyd resin content). Films four thousandths of an inch thick were spread on glass and allowed to dry at 25° C. for 16 hours. The cross-linked films were exposed to a source of ultra-violet light (2357 A) for 24 hours, the source being approximately eight inches away from the surface of the films. The change in gloss as measured at the 45° head of a standard gloss-meter of the two films was compared. It was found that the paint catalysed with conventional driers had decreased from 99% to 76% whereas that of the paint catalysed with paratoluene sulphonic acid had increased from 99% to 104%.

EXAMPLE 9

This Example illustrates the effect of excess hydroxyl groups in the film-forming polymer on the extent of curing according to this invention.

A series of alkyds was prepared by conventional polymerisation and formulated to contain excess hydroxyl groups over carboxyl groups such that the hydroxyl values varied in the range 20–150 mg KOH/g. The alkyds were also formulated so that the unsaturated fatty acid and the molecular weight (as measured by viscosity) were constant within experimental limits. The alkyds were condensed to contain residual acid values of less than 10 mg KOH/g and were thinned to 70% solids content in white spirit.

Samples of each alkyl were catalysed by addition of 4% of dodecyl benzene sulphonic acid calculated on the non-volatile content of the resin and added as a 75% solution in isopropanol. Wet films of four thousandths of an inch thick were spread on glass panels and the surface and through drying assessed using a Sand Track machine and a Beck Koller Drying Recorder (BK). The results are shown in the following table:

| | Molar formula | | | Acid Value mg KOH/g | Hydroxyl Value mg KOH/g | Viscosity at 70% solids | Sand Track (hrs) | B.K. (hrs) |
|---|---|---|---|---|---|---|---|---|
| 1. | PE / 2.75 | PA / 2 | DCOFA 3 | 5 | 157 | 33 | 5 | 5.0 |
| 2 | PE / 2.5 | PA / 2 | DCOFA 3 | 5 | 121 | 35 | 5 | 5.5 |
| 3. | PE / 2.37 | PA / 2 | DCOFA/Stearic Acid 2.96    0.04 | 4 | 101 | 34 | 6 | 4.5 |

-continued

|   | Molar formula | | | | Acid Value mg KOH/g | Hydroxyl Value | Viscosity at 70% solids | Sand Track (hrs) | B.K. (hrs) |
|---|---|---|---|---|---|---|---|---|---|
| 4. | PE / 2.25 | PA / 2 | DCOFA/ 2.92 | Stearic Acid 0.08 | 4 | 80 | 38 | 5 | 3.5 |
| 5. | PE / 2.1 | PA / 2 | DCOFA/ 2.88 | Stearic Acid 0.12 | 7 | 59 | 32 | 4 | 3.25 |
| 6. | PE / 1.9 | PA / 1.85 | DCOFA/ 2.78 | Stearic Acid 0.22 | 6 | 40 | 42 | 4 | 3.0 |
| 7. | PE / 1.8 | PA / 1.9 | DCOFA/ 2.76 | Stearic Acid 0.24 | 10 | 18 | 34 | 6 | 5.0 |

Key:
PE = pentaerythritol;
PA = phthalic anhydride
DCOFA = dehydrated castor oil fatty acid An alkyd of hydroxyl value 28 mg KOH/g was treated with octadecyl isocyanate in sufficient quantity to react with all the excess hydroxyl group. The final product contained no significant amount of free isocyanate or hydroxyl as measured by infra-red spectroscopy. The measurement of drying times of this alkyd when catalysed as above showed a surface dry time (sand track) of 12+ hours and a through hardening time of 12+ hours. The film also showed a severe surface tackiness after 16 hours.

EXAMPLE 10

This Example illustrates the preparation of pigmented paints which are cured according to the present invention.

An alkyd resin was prepared by conventional condensation polymerisation according to the molar formula PE/Glycerol/PA/DCOFA=1.75/1/2/3

It was condensed to an AV of 5 mg KOH/g and thinned to 70% solids in white spirit. The unsaturated fatty acid content of the resin was 61.4% and it had an excess hydroxyl content of 121 mg KOH/g at zero acid value.

(a) Preparation of white paint
29.4 parts of rutile titanium dioxide were dispersed by ball milling in a mixture of 8.3 parts of 70% solution of an alkyd prepared as described above and 5.25 parts of white spirit. A further 43 parts of the alkyd were added and the resultant paint was thinned to 3.5 poise at 25° C. and 10,000 secs$^{-1}$ by addition of 11.4 parts of white spirit.

2.9 parts of a 50% solution of paratoluene sulphonic acid in ethoxyethanol were added as catalyst.

Films of the paint four thousandths of an inch thick were spread on glass and the surface drying the through-drying times assessed using the Sand Track machine and the Beck Koller Drying Recorder. The results showed that the films were touch dry in 4 hours and through dry in 6 hours and had a gloss of 97% (45° head on glossmeter).

(b) A red paint was prepared by first dispersing 506 parts of an organic red pigment (Monolite Red 2Y) in 345 parts of a 70% solution of the alkyd prepared as described above and 345 parts of white spirit. A further 414 parts of the alkyd solution and 138 parts of white spirit were then added to the millbase after dispersion was complete.

400 g of this base was further mixed with 1027 g of alkyd solution to complete the preparation of the print.

169 g of the paint was catalysed by addition of 7.8 g of a 50% solution of paratoluene sulphonic acid, in ethoxyethanol and thinned to 3.5 poise at 10,000 secs$^{-1}$ and 25° C. by addition of white spirit.

A similar quantity of paint was catalysed by addition of conventional metallic driers: 3.6 g of lead driers (36% lead metal), 0.4 g cobalt driers (10% cobalt metal) and 8.4 g of calcium driers (5% calcium metal).

Films of four thousandths of an inch thickness were spread on glass and the rate of drying assessed. Through dry times of 6 hours were recorded in both cases and touch dry times of 3 hours and 2 hours recorded for the acid catalysed and metallic driers-catalysed paints respectively.

Measurements of the 45° gloss of both paints after overnight drying were 101% for the acid-catalysed paint and 89% for the metallic driers-catalysed paints. After 3 months storage in diffuse sunlight, the gloss of the acid-catalysed paint was 92% whereas that of the metallic driers-catalysed paint was 74%.

EXAMPLE 11

This Example illustrates the effect of adding a non-autoxidisable radical-polymerisable ethylenically unsaturated monomer to a composition according to the invention.

An alkyd resin was prepared by a conventional condensation polymerisation procedure in white spirit using the ingredients pentaerythritol (340 parts), phthalic anhydride (296 parts) and dehydrated castor oil fatty acids (850 parts) in a molar ratio of 2.5/2.0/3.0. The final product had an acid value of 4 mg KOH/g and was diluted to 75% solids content with white spirit.

Four separate unpigmented coating compositions (a)–(d), were prepared as follows:

|  | (a) | (b) | (c) | (d) |
|---|---|---|---|---|
| Alkyd resin as 75% solids solution in white spirit (parts) | 100 | 90 | 75 | 50 |
| Ethylene glycol dimethacrylate (parts) | — | 10 | 25 | 50 |

To each composition was added (as a 50% by weight solution in ethoxy ethanol) 4 parts of p-toluene sulphonic acid monohydrate and a coating of each composition. A thousandth inch thick coating was spread onto glass plates and allowed to stand at room temperature in the atmosphere. All of the coatings yielded a hard, tough film after drying overnight. The film produced from (a) was somewhat shrivelled whereas the films produced from (b), (c) and (d) were not shrivelled. There was no evidence of air inhibition. Similar results were obtained with hexane diol diacrylate. Other monomers which were used to modify the properties of coating films according to the invention included lauryl methacrylate and styrene.

When the monomers styrene, methyl methacrylate, vinyl toluene and divinyl benzene respectively were separately mixed with an equal weight of the alkyd resin described above and with 4% by weight based on the combined weight of resin and monomer of p-toluene sulphonic acid, and were left in the bulk in a test tube overnight, the product was a solid mass of polymer.

We claim:

1. A method of preparing a cured coating film by applying to a substrate a liquid coating which is free from metal catalyst and which comprises
   (a) a film-forming material comprising moieties of an ethylenically unsaturated fatty acid containing at least two ethylenically unsaturated groups, said film-forming material being selected from the group consisting of oil-modified alkyd resins, oil-modified addition polymers of ethylenically unsaturated monomers, epoxy esters of ethylenically unsaturated fatty acids, oil-modified polyurethane oils and oil-modified polyurethane alkyds, and
   (b) an acid which is fully dissociated when in the presence of water, said acid being selected from the group consisting of a sulphonic acid, hydrochloric acid and sulphuric acid,
and thereafter exposing the coating to oxygen until fully cured, the acid functioning to catalyze autoxidation of component (a).

2. A method according to claim 1 wherein the liquid coating is exposed to oxygen at the ambient temperature.

3. A composition capable of curing in the presence of oxygen, said composition being free from metal catalyst and comprising
   (a) a film-forming material comprising moieties of an ethylenically unsaturated fatty acid containing at least two ethylenically unsaturated groups, said film-forming material being selected from the group consisting of oil-modified alkyl resins, oil-modified addition polymers of ethylenically unsaturated monomers, epoxy esters of ethylenically unsaturated fatty acids, oil-modified polyurethane oils and oil-modified polyurethane alkyds, and
   (b) an acid which is fully dissociated when in the presence of water, said acid functioning to catalyze autoxidation of component (a) and being selected from the group consisting of sulphonic acid, hydrochloric acid and sulphuric acid.

4. A composition according to claim 3 wherein the moiety of an ethylenically unsaturated fatty acid comprises conjugated ethylenic unsaturation.

5. A composition according to claim 3 wherein the moiety of an ethylenically unsaturated fatty acid is derived from linseed oil, dehydrated castor oil, tung oil or isomerginate oil.

6. A composition according to claim 3 wherein the film-forming material is an oil-modified alkyd resin or an oil-modified addition polymer of hydroxyl value 20–200 mg KOH/g.

7. A composition according to claim 3 wherein the film-forming polymer comprises at least 30% by weight of unsaturated fatty acid moieties.

8. A composition according to claim 3 wherein the acid catalyst is present in an amount in the range 0.1–20% by weight based on the weight of film-forming material.

9. A composition according to claim 3 which comprises also
   (c) a non-autoxidisable ethylenically unsaturated monomeric, oligomeric or other material containing ethylenically unsaturated groups which is polymerisable in the presence of free radicals.

10. A cured coating film prepared by the method of claim 1, said film being supported on a substrate.

11. A polymeric product prepared by treating with oxygen a composition according to claim 3.

* * * * *